US 006588538B2

(12) United States Patent
Hinton et al.

(10) Patent No.: US 6,588,538 B2
(45) Date of Patent: Jul. 8, 2003

(54) WHEEL AND FINAL DRIVE ASSEMBLY FOR A GROUND DRIVEN WORK MACHINE

(75) Inventors: David R. Hinton, Mt. Zion, IL (US); Keith A. Kabrick, Springfield, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/904,049

(22) Filed: Jul. 12, 2001

(65) Prior Publication Data

US 2003/0010564 A1 Jan. 16, 2003

(51) Int. Cl.$^7$ ............................................. B60K 17/04
(52) U.S. Cl. ........................................ 180/372; 180/363
(58) Field of Search ................................ 180/363, 371, 180/372, 374, 383, 385; 475/331; 301/6.5, 36.1

(56) References Cited

U.S. PATENT DOCUMENTS

| | | | | |
|---|---|---|---|---|
| 2,805,743 A | * | 9/1957 | Keese | 180/344 |
| 3,387,502 A | * | 6/1968 | Tourneau | 180/339 |
| 3,770,074 A | * | 11/1973 | Sherman | 180/339 |
| 4,142,615 A | * | 3/1979 | Sidles et al. | 180/370 |
| 4,330,045 A | * | 5/1982 | Myers | 180/65.5 |
| 4,799,564 A | | 1/1989 | Iijima et al. | |
| 4,873,894 A | * | 10/1989 | Avery et al. | 74/391 |
| 4,930,590 A | | 6/1990 | Love et al. | |
| 6,148,941 A | * | 11/2000 | Hinton et al. | 180/65.5 |

OTHER PUBLICATIONS

GE Electric Final Drive Advertisement, "GDY85 AC Motorized Wheel for Off–Highway Vehicles", GEJ–6787, Undated.
GE Electric Final Drive Advertisement, "GE Motorized Wheel for Off–Highway Vehicles", GEZ 7222A, Undated.
GE Electric Final Drive Advertisement, "GEB23 AC Motorized Wheel for Off–Highway Vehicles", Undated.
GE Electric Final Drive Advertisement, "Typical 787/788 Motorized Wheel for Off–Highway Vehicles", GEZ 7306B, Undated.

* cited by examiner

Primary Examiner—Paul N. Dickson
Assistant Examiner—David R. Dunn
(74) Attorney, Agent, or Firm—Thomas L Derry; Larry G Cain

(57) ABSTRACT

A wheel and final drive assembly for a work machine, such as a mining truck, having a driven rotatable wheel having inboard and outboard rims mounted thereto. The final drive assembly including a first and a second reduction gear assembly. A ring gear adapter having an inboard end, an outboard end, and an inner surface, a plurality of teeth disposed about the inner surface and interacting with a plurality of planetary gears of the first and second gear reduction assemblies and the inboard end of the ring gear adapter removably coupled to the outboard flange of the wheel.

14 Claims, 4 Drawing Sheets

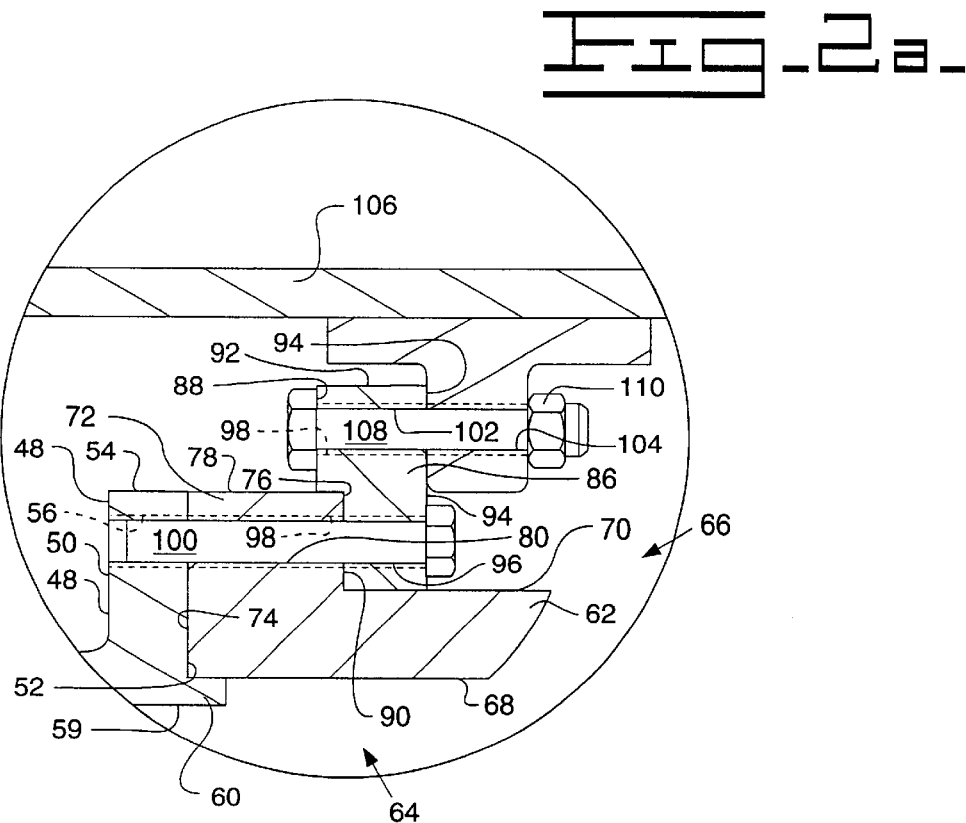
Fig_2a_
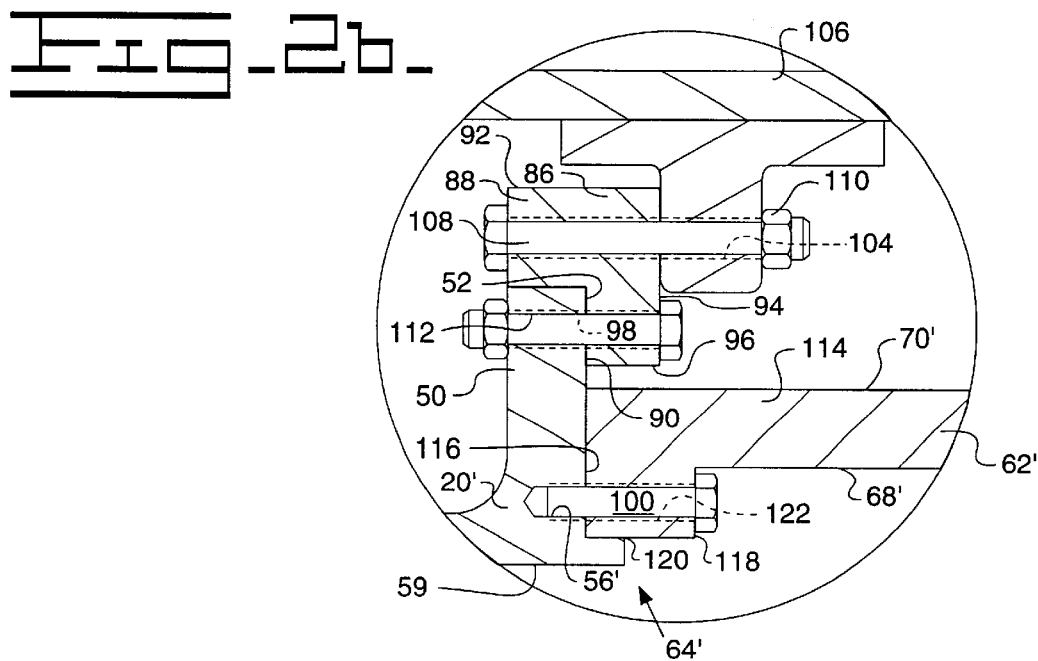
Fig_2b_

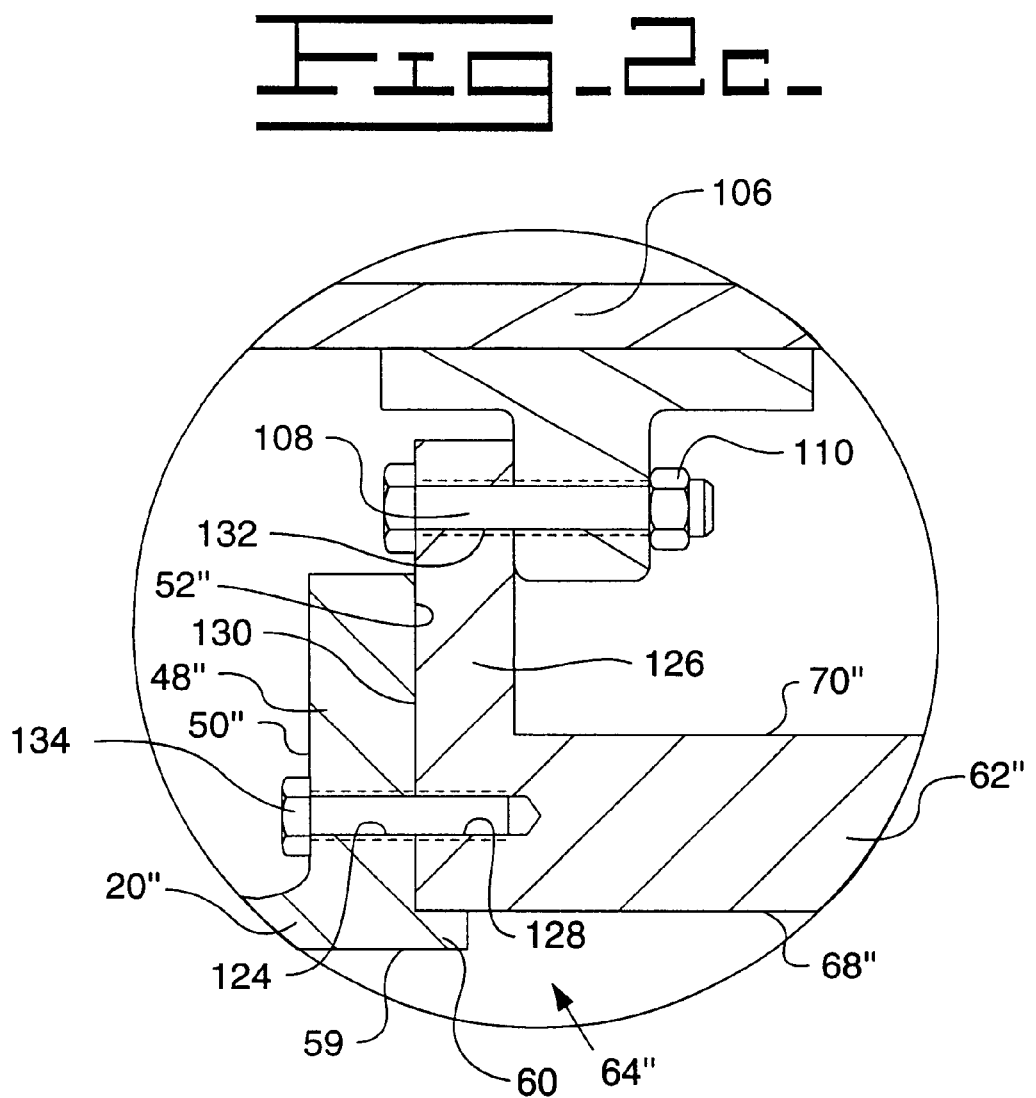

WHEEL AND FINAL DRIVE ASSEMBLY FOR A GROUND DRIVEN WORK MACHINE

TECHNICAL FIELD

This invention relates to a wheel and final drive assembly having a ring gear output for ground-driven work machine, such as an off-highway truck.

BACKGROUND

Large earth working machines, such as large mining trucks, typically have at least one pair of driven wheels that are rotatably mounted on corresponding axles or spindles. Each wheel may be driven through a final drive assembly, which is typically a double reduction planetary gear arrangement. Typical planetary gear arrangements include a sun gear rotatably coupled to an input shaft, a set of planetary gears disposed about the sun gear and held by a carrier, and a ring gear disposed about the planetary set. The double reduction gear arrangements typically have an input to a first reduction sun gear and an output through a second reduction carrier or ring gear. Power transfer from the first reduction planetary set to the second reduction gear set can be through the first carrier to the second sun gear. A final drive adapter is used to transmit the final output to the rotatably mounted wheel. The final drive adapter couples the second reduction gear assembly to the wheel via a second carrier to wheel adapter or a second ring gear to wheel adapter.

As the size and capacity of large work machines increases, greater amounts of gear reduction are required to move the machines across the ground. Because the final drive must be confined within the wheel and rim, the structural design and geometric configuration of the final drive adapter can impact the amount of gear reduction. Another problem incurred when designing final drive assemblies with greater gear reduction is the ability to perform routine maintenance. It is preferable, although not always possible, to provide a wheel and final drive assembly that permits maintenance and service of the gear reduction portion of the final drive assembly without having to remove the outboard tire and rim.

In U.S. Pat. No. 6,148,941, a wheel and final drive assembly having a carrier output adapter is described. The output of the reduction gear assembly is maximized by providing a segmented rim mounting flange attached to an inboard surface of the wheel. The segmented rim mounting flange permits access to the mechanical components of the reduction gear assembly without the need to remove the outboard rim. Although this design increased the amount of gear reduction through the final drive, the continued increase in machine size creates a need for a further increase in gear reduction.

SUMMARY OF THE INVENTION

In one aspect of the present invention, a wheel and final drive assembly for a work machine is provided. The wheel includes an inboard rim mounting flange, an outboard mounting flange and an intermediate portion. The final drive assembly includes a first planetary gear reduction assembly and a second planetary gear reduction assembly. The second gear reduction assembly is positioned outboard of the first gear reduction assembly. A substantially cylindrical ring gear adapter includes an inboard end, and outboard end and an inner surface having a plurality of teeth disposed thereabout. The ring gear adapter interacts with the first and second reduction gear assemblies and is removably attached to the outboard end of the wheel.

In another aspect of the present invention, a work machine having a wheel and final drive assembly is provided. The wheel includes an inboard rim mounting flange, an outboard mounting flange and an intermediate portion. The final drive assembly includes a first planetary gear reduction assembly and a second planetary gear reduction assembly. The second gear reduction assembly is positioned outboard of the first gear reduction assembly. A substantially cylindrical ring gear adapter includes an inboard end, and outboard end and an inner surface having a plurality of teeth disposed thereabout. The ring gear adapter interacts with the first and second reduction gear assemblies and is removably attached to the outboard end of the wheel.

BRIEF DESCRIPTION OF THE DRAWINGS

FIG. 2a is an enlarged section view of FIG. 2, taken along line 2b, illustrating one embodiment of the present invention.

FIG. 2b is an enlarged section view of FIG. 2, taken along line 2b, of another embodiment of the present invention.

FIG. 2c is an enlarged section view of FIG. 2, taken along line 2b, of yet another embodiment of the present invention.

DETAILED DESCRIPTION

Figure 1:
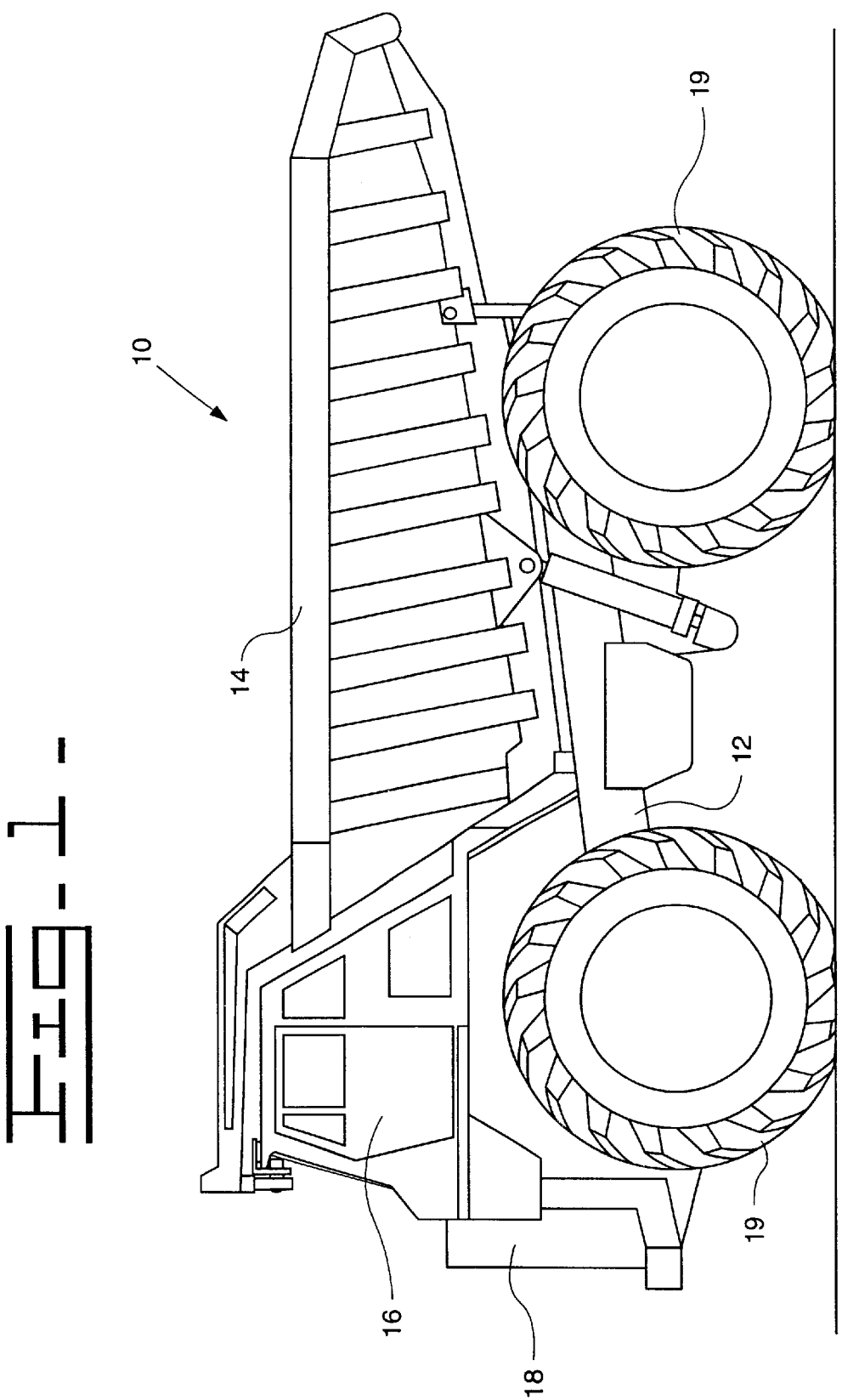
FIG. 1 is a side elevational view of mining dump truck with which this invention may be used.

FIG. 1 illustrates an off-highway truck, generally designated as 10, on which this invention may be used. The truck comprises a frame 12, a material carrying dump body 14 pivotally mounted to the frame 12. A operator cab 16 is mounted on the front of the frame 12 above an engine enclosure 18. The truck 10 is supported on the ground by a pair of front tires 19 (one shown), and a pair of driven rear tires 19 (one shown) support the truck 10 at the rear. As well known in the art, one or more engines (not shown) are housed within the engine enclosure 18. The engine is used to provide power to the wheel 20 and final drive assembly 21, via a mechanical or electric drive train.

Figure 2:
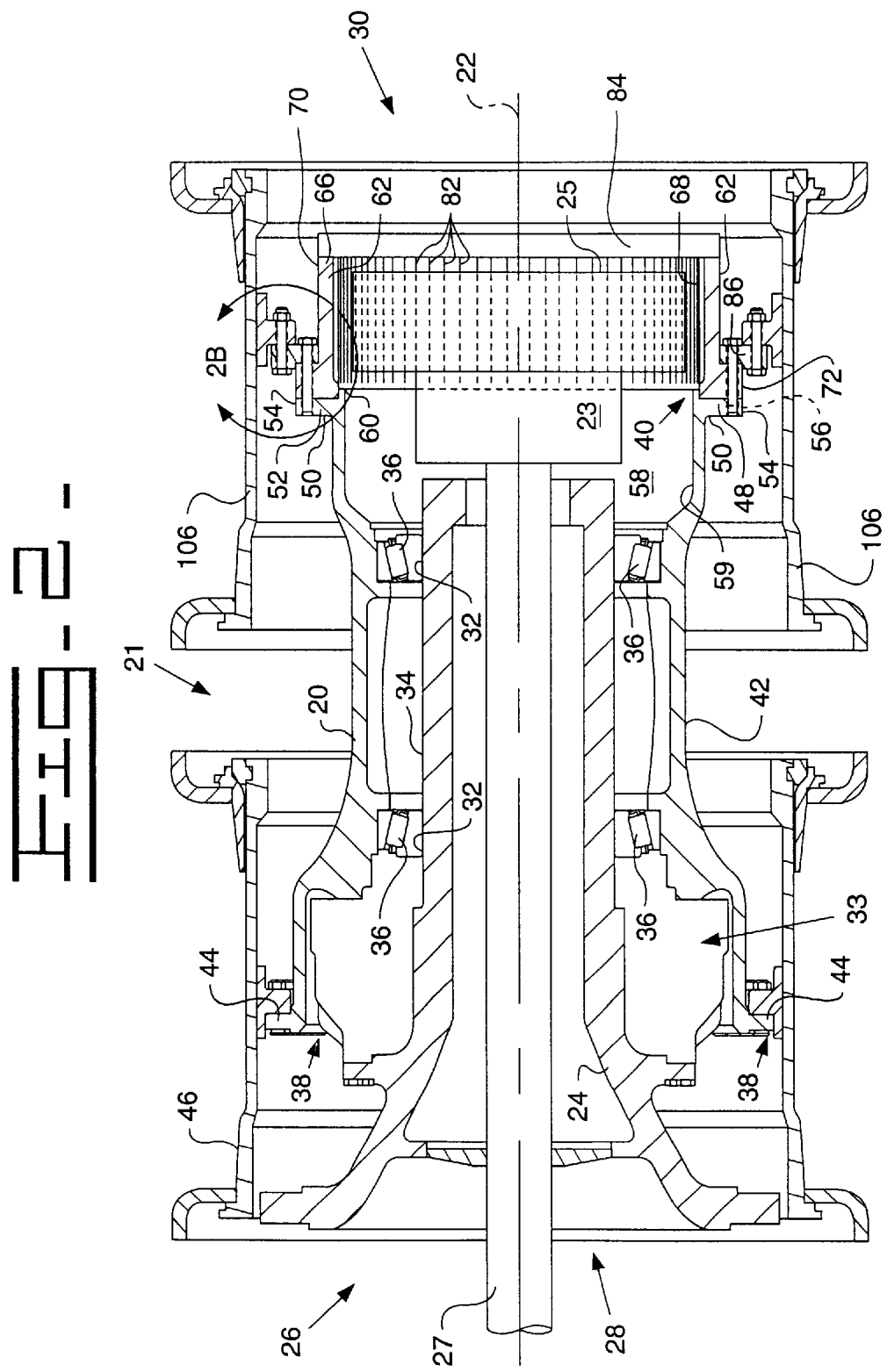
FIG. 2 is a cross-sectional view showing a wheel and final drive assembly in accordance with the present invention.

Referring now to FIGS. 2 and 2a, a wheel 20 and final drive assembly 21 is defined about a horizontal central axis 22. The final drive assembly 21 includes a first 23 and second reduction gear assembly 25. A substantially cylindrical spindle 24 is defined about the central axis 22. The spindle 24 is adapted on a first end (inboard end) 26 to attach to a differential housing (not shown) or an electric drive motor housing. The spindle 24 further defines a hole 28 about the central axis 22, the hole 28 extends from the inboard end 26 to a second end (outboard end) 30. An input shaft or drive shaft 27 typically extends through the hole 28 to transmit power to the first planetary reduction gear assembly 23. A pair of bearing mounting surfaces 32 are defined about an outer surface 34 of the spindle 24.

In one embodiment of the present invention, a wheel 20 is rotatably mounted on the spindle 24 via a pair of wheel bearings 36. The wheel 20 defines an inboard end 38, an outboard end 40 and an outer surface 42. The inboard end 38 of the wheel 20 includes a radially outwardly extending inboard rim mounting flange 44 defined about the central axis 22. An inboard rim assembly 46 is attached to the inboard rim mounting flange 44 in a conventional manner using threaded fasteners. The outboard end 40 of the wheel 20 includes a radially outwardly extending outboard mounting flange 48, also disposed about the central axis 22. The outboard mounting flange 48 has an inboard surface 50, an outboard surface 52 and an outside edge 54 that adjoins the inboard and outboard surfaces 50,52. A plurality of threaded holes 56 are disposed in a circular pattern on the inboard surface 50 about the central axis 22, the threaded holes 56 extend toward the outboard surface 52. An outboard annular portion 58 is defined about the central axis 22 near the outboard end 30 of the wheel 20. The outboard annular portion 58 defines an inner surface 59. An alignment ring 60 is further defined about the outboard end 30 of the wheel 20. The alignment ring 60 extends axially outward from the outboard surface 52 of the mounting flange 48 and is preferably integral of the rotatable wheel 20. The first and second reduction gear assemblies 23,25 are adapted to fit within the outboard annular portion 58.

A ring gear adapter 62 defines a substantially cylindrical member disposed about the central axis 22. The ring gear adapter 62 has an inboard end 64, an outboard end 66, an inner surface 68 and an outer surface 70. The inboard end 64 of the ring gear adapter 62 includes a radially outwardly extending mounting flange 72 disposed thereabout. The mounting flange 72 includes an inboard surface 74, an outboard surface 76 and an outside edge 78 disposed therebetween. A plurality of holes 80 are disposed in a circular pattern about the central axis 22 the and extend from the inboard surface 74 of the mounting flange 70 toward the outboard end 66 of the adapter 62. A plurality of parallel teeth 82 are disposed about the inner surface 68 of the ring gear adapter 62. The teeth 82 are oriented in an axial direction. The teeth 82 are adapted to be drivingly engaged with a plurality of teeth (not shown) disposed on a set of planetary gears (not shown) that are included in the second reduction gear assembly 25. The outboard end 66 of the ring gear adapter 62 is adapted to engage an end plate 84, or cover. The end plate 84 may be attached by bolts (not shown) or any other suitable attachment method.

An outboard rim mounting ring 86 is defined about the central axis 22. The outboard rim mounting ring 86 includes a first inboard surface 88, a second inboard surface 90 and an exterior surface 92, adjoining the first inboard surface 88 and an outboard surface 94. An interior edge 96 is defined between the second inboard surface 90 and the outboard surface 94. A first plurality of through holes 98 are defined in a circular pattern about the central axis 22 on the outboard rim mounting ring 86. The first plurality of through holes 98 correspond to the holes 56,80 in the wheel 20 and ring gear adapter 62 and extend from the outboard surface 94 to the second inboard surface 90. A bolt 100 is inserted into each of the holes of the first plurality of through holes 98 of the rim mounting ring, through one of a corresponding hole 80 on the ring gear adapter 62 and into of a corresponding one of the holes 56 of the wheel 20. A second plurality of holes 102 are defined on the outboard rim mounting ring 86 and positioned about the central axis 22, at a location radially outward from the first plurality of holes 98. The second plurality of holes 102 correspond to a plurality of holes 104 on the outboard rim 106. A rim stud 108 is inserted from the first inboard surface 88 of the rim mounting ring 86 into each of the plurality of through holes 102. Each rim stud 108 is further aligned with, and inserted into, one of the holes 104 of the outboard rim 106. A nut 110 engages each rim stud 108 to attach the rim 106 to the rim mounting ring 88.

FIG. 2b illustrates an alternate embodiment of the present invention. The plurality of threaded holes 56' defined about the outboard mounting flange 48'. The threaded holes 56' are disposed in a circular pattern at a predetermined distance (d1) from the central axis 22'. A second (outer) plurality of holes 112 are disposed about the outboard mounting flange at a second predetermined distance (d2) from the central axis 22'. The second plurality of holes 112 extend from the outboard surface 52 to the inboard surface 50 of the outboard mounting flange 48'. The second plurality of holes 112 correspond with the plurality of through holes 98 defined on the rim mounting ring 86. The rim mounting ring 86 is removably attached to the outboard mounting flange 48' using common bolts and nuts, but may employ any conventional fastening method.

The inboard end 64 of the ring gear adapter 62' includes a radially inwardly extending mounting flange 114. The mounting flange 114 includes an inboard surface 116, an outboard surface 118 and an inside edge 120 therebetween. A plurality of through holes 122 a disposed in a circular pattern about the central axis 22 and extend from the inboard surface 116 of the mounting flange 114 to the outboard surface 118. The plurality of holes 122 correspond to the plurality of threaded holes 56' in the outboard end 40 of the rotatable wheel 20'. A bolt 100 is inserted through each of the plurality of holes 122 of the mounting flange 114 and threaded into one of the plurality of threaded holes 56' of the wheel 20'.

Illustrated in FIG. 2c, another embodiment of the present invention includes a rotatable wheel 20" having the outboard mounting flange 48" on the outboard end 40 of the wheel 20". A plurality of through holes 124 extend from the inboard surface 50" of the outboard mounting flange 48" to the outboard surface 52". The plurality of holes 124 are defined in a circular pattern around the central axis 22 and correspond to a plurality of threaded holes 128 in the ring gear adapter 62".

The ring gear adapter 62" includes a radially outwardly extending flange 126 disposed about its inboard end 64. The plurality of threaded holes 128 in the ring gear adapter 62" extend from an inboard surface 130. A plurality of through holes 132 are disposed about the outwardly extending flange 126 at a radial distance from the central axis 22 that is greater the distance from the central axis 22 of the plurality of threaded holes 128. Bolts 134 attach the ring gear adapter 62" to the outboard mounting flange 48" of the wheel 20".

A rim stud 108 is inserted into each of the plurality of through holes 132 to attach the outboard rim 106 to the ring gear adapter 62".

INDUSTRIAL APPLICABILITY

The wheel 20 and final drive assembly 21 described above provides several advantages over constructions previously known in the art. More particularly, because the ring gear adapter 62 provides an inner surface 68 that is substantially equal or large in diameter to the annular portion 58 of the wheel 20 the diameter of the ring gear is maximized, therefor maximizing the amount of reduction created by the second reduction gear assembly 25. In addition, the ring gear adapter being removably attached to the wheel 20 and having a removable end plate 84 allows service and maintenance to the reduction gear assemblies 23,25 without having to completely disassemble the final drive assembly 21 and outboard rim 106.

Although the presently preferred embodiments of this invention have been described, it will be understood that within the purview of the invention various changes may be made within the scope of the claims.

What is claimed is:

1. A wheel and final drive assembly for a work machine, comprising:

said wheel having an inboard rim mounting flange, an outboard mounting flange and an intermediate portion;

said final drive assembly having a first planetary gear reduction assembly, a second planetary gear reduction assembly coupled to said first planetary gear reduction assembly, said second planetary gear reduction assembly being positioned outboard of said first gear reduction assembly;

a substantially cylindrical ring gear adapter connected to said first and second planetary gear reduction assemblies, said ring gear adapter having an inboard end, an outboard end, an inner surface having a plurality of teeth disposed thereon interacting with said first and second planetary gear reduction assemblies, said inboard end of said ring gear adapter being removably attached to said outboard mounting flange of the wheel; and an end plate removably coupled to said ring gear adapter.

2. The wheel and final drive assembly of claim 1 wherein said ring gear adapter includes a radially outwardly extending mounting flange at said inboard end.

3. The wheel and final drive assembly of claim 2 having a first plurality of through holes disposed about said radially outwardly extending mounting flange.

4. The wheel and final drive assembly of claim 3, said ring gear adapter having a second plurality of through holes disposed about said radially outwardly extending mounting flange at a location radially outward of said first plurality of through holes.

5. The wheel and final drive assembly of claim 2 having an outboard rim mounting ring removably attached to an outboard surface of said radially outwardly extending mounting flange of said ring gear adapter.

6. The wheel and final drive assembly of claim 1, said ring adapter further including a radially inwardly projecting mounting flange adjacent to said inboard end.

7. The wheel and final drive assembly of claim 1, said ring gear adapter including a plurality of threaded holes extending from said inboard end toward said outboard end.

8. A work machine having a wheel and final drive assembly comprising:

said wheel having an inboard rim mounting flange, an outboard mounting flange and an intermediate portion;

said final drive assembly having a first planetary gear reduction assembly, a second planetary gear reduction assembly coupled to said first planetary gear reduction assembly, said second planetary gear reduction assembly being positioned outboard of said first gear reduction assembly;

a substantially cylindrical ring gear adapter connected to said first and second planetary gear reduction assemblies, said ring gear adapter having an inboard end, an outboard end, an inner surface having a plurality of teeth disposed thereon and interacting with said first and second planetary gear reduction assemblies, said inboard end of the ring gear adapter being removably attached to said outboard mounting flange of said wheel; and an end plate removably coupled to said ring gear adapter.

9. The work machine of claim 8 wherein said ring gear adapter includes a radially outwardly extending mounting flange at said inboard end.

10. The work machine of claim 9 having a first plurality of holes disposed about said radially outwardly extending mounting flange.

11. The work machine of claim 10 having a second plurality of holes disposed about said radially outwardly extending mounting flange at a location radially outward of said first plurality of through holes.

12. The work machine of claim 8 said ring gear adapter further including a radially inwardly projecting mounting flange at said inboard end.

13. The work machine of claim 8, said ring gear adapter including a plurality of threaded holes extending from said inboard end toward said outboard end.

14. The work machine of claim 9 having an outboard rim mounting ring removably attached to an outboard surface of said radially outwardly extending mounting flange of said ring gear adapter.

* * * * *